United States Patent
Ichihara et al.

(10) Patent No.: US 11,990,261 B2
(45) Date of Patent: May 21, 2024

(54) GRAIN-ORIENTED ELECTRICAL STEEL SHEET

(71) Applicant: JFE STEEL CORPORATION, Tokyo (JP)

(72) Inventors: Yoshihisa Ichihara, Tokyo (JP); Takeshi Omura, Tokyo (JP); Hirotaka Inoue, Tokyo (JP); Kunihiro Senda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/998,356

(22) PCT Filed: Mar. 4, 2021

(86) PCT No.: PCT/JP2021/008542
§ 371 (c)(1),
(2) Date: Nov. 10, 2022

(87) PCT Pub. No.: WO2021/250953
PCT Pub. Date: Dec. 16, 2021

(65) Prior Publication Data
US 2023/0178276 A1    Jun. 8, 2023

(30) Foreign Application Priority Data
Jun. 9, 2020 (JP) .................. 2020-100436

(51) Int. Cl.
*H01F 1/16* (2006.01)
*B32B 3/00* (2006.01)
(Continued)

(52) U.S. Cl.
CPC ............ *H01F 1/16* (2013.01); *B32B 3/00* (2013.01); *B32B 3/10* (2013.01); *B32B 3/26* (2013.01);
(Continued)

(58) Field of Classification Search
CPC ......... H01F 1/16; H01F 1/147; C21D 8/1277; C21D 8/1294; C21D 9/46; C21D 7/02;
(Continued)

(56) References Cited

U.S. PATENT DOCUMENTS 4,613,842 A * 9/1986 Ichiyama ............... H02K 1/06
   148/121
6,083,326 A   7/2000 Komatsubara et al.
(Continued)

FOREIGN PATENT DOCUMENTS

EP   0219181 B1   10/1990
EP   2615189 B1   2/2017
(Continued)

OTHER PUBLICATIONS

May 18, 2021, International Search Report issued in the International Patent Application No. PCT/JP2021/008542.
(Continued)

*Primary Examiner* — Michael E. La Villa
(74) *Attorney, Agent, or Firm* — KENJA IP LAW PC

(57) ABSTRACT

Provided is a linear groove formation pattern with which both an effect of reducing the building factor and a high magnetic flux density can be obtained. In a grain-oriented electrical steel sheet having a plurality of linear grooves extending in a direction crossing a rolling direction of the steel sheet on a surface of the steel sheet, a surface of the steel sheet between the linear grooves has a recessed defect that is recessed from the surface, a volume fraction of the recessed defect in the steel sheet is 0.0025 vol % or more and 0.01 vol % or less of a steel sheet without the recessed defect, and discontinuous portions that disrupt the extension of the linear grooves are provided at a frequency of 30 or more and 200 or less per square meter of the steel sheet.

8 Claims, 10 Drawing Sheets

(51) Int. Cl.

| | |
|---|---|
| *B32B 3/10* | (2006.01) |
| *B32B 3/26* | (2006.01) |
| *B32B 3/30* | (2006.01) |
| *C21D 8/12* | (2006.01) |
| *C21D 9/46* | (2006.01) |
| *C22C 38/00* | (2006.01) |
| *C25F 3/06* | (2006.01) |
| *H01F 1/147* | (2006.01) |
| *C21D 7/02* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/60* | (2006.01) |

(52) U.S. Cl.
CPC .............. *B32B 3/263* (2013.01); *B32B 3/30* (2013.01); *C21D 8/1277* (2013.01); *C21D 8/1294* (2013.01); *C21D 9/46* (2013.01); *C25F 3/06* (2013.01); *H01F 1/147* (2013.01); *C21D 7/02* (2013.01); *C21D 2201/05* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/60* (2013.01); *C22C 2202/02* (2013.01); *Y10T 428/12972* (2015.01); *Y10T 428/12993* (2015.01)

(58) Field of Classification Search
CPC ..... C21D 2201/05; C25F 3/06; C22C 38/001; C22C 38/002; C22C 38/02; C22C 38/04; C22C 38/06; C22C 38/08; C22C 38/60; C22C 2202/02; B32B 3/00; B32B 3/10; B32B 3/26; B32B 3/263; B32B 3/30; Y10T 428/12972; Y10T 428/12993
See application file for complete search history.

(56) References Cited

U.S. PATENT DOCUMENTS

| | | | |
|---|---|---|---|
| 2018/0147663 | A1* | 5/2018 | Takajo ................ C21D 10/005 |
| 2021/0043358 | A1 | 2/2021 | Inoue et al. |
| 2021/0054489 | A1 | 2/2021 | Tanaka et al. |
| 2021/0082606 | A1 | 3/2021 | Mogi et al. |

FOREIGN PATENT DOCUMENTS

| | | |
|---|---|---|
| EP | 3438293 B1 | 7/2020 |
| JP | S6286121 A | 4/1987 |
| JP | H0622179 B2 | 3/1994 |
| JP | 2003129135 A | 5/2003 |
| JP | 2008057001 A | 3/2008 |
| JP | 4719319 B2 | 7/2011 |
| JP | 2012077380 A | 4/2012 |
| JP | 2017145490 A | 8/2017 |
| JP | 2019024039 A | 2/2019 |
| JP | 2019137883 A | 8/2019 |
| JP | 6579294 B1 | 9/2019 |
| KR | 1020200072273 A | 6/2020 |
| WO | 2017171013 A1 | 10/2017 |
| WO | 2019151397 A1 | 8/2019 |
| WO | 2019151399 A1 | 8/2019 |
| WO | 2019182149 A1 | 9/2019 |

OTHER PUBLICATIONS

Jul. 22, 2023, Office Action issued by the China National Intellectual Property Administration in the corresponding Chinese Patent Application No. 202180034717.6 with English language search report.

Dec. 1, 2023, the Extended European Search Report issued by the European Patent Office in the corresponding European Patent Application No. 21821594.5.

* cited by examiner

GRAIN-ORIENTED ELECTRICAL STEEL SHEET

TECHNICAL FIELD

The present disclosure relates to a grain-oriented electrical steel sheet suitable as, for example, an iron core material for transformers.

BACKGROUND

A grain-oriented electrical steel sheet is used as a material for transformer iron cores, and the energy loss of a transformer is greatly affected by the iron loss of the grain-oriented electrical steel sheet. In recent years, energy conservation and environmental regulations have strongly demanded a reduction in energy loss in transformers. Because the iron loss of a transformer is affected by the iron loss of a grain-oriented electrical steel sheet as a material, it is very important to develop a grain-oriented electrical steel sheet with low iron loss.

The iron loss of a grain-oriented electrical steel sheet is classified into hysteresis loss and eddy current loss. Methods that have been developed to improve the hysteresis loss properties include a method of highly orienting the (110) [001] orientation, which is called GOSS orientation, in the rolling direction, and a method of reducing impurities. On the other hand, methods that have been developed to improve the eddy current loss properties include a method of increasing electric resistance by adding Si, and a method of applying film tension in the rolling direction. However, it is difficult to further reduce the iron loss with these methods due to manufacturing limitations.

Therefore, a so-called magnetic domain refining technology has been developed, which is a method of introducing magnetic flux non-uniformity into a steel sheet, on which an insulating coating has been baked during final annealing, with a physical method such as forming grooves or introducing local strain to subdivide the width of 180° magnetic domain (main magnetic domain) formed along the rolling direction, thereby reducing iron loss, especially eddy current loss.

In this magnetic domain refining technology, a method whose effect is not lost even after stress relief annealing is called a heat resistant magnetic domain refining method. This method is generally applied to materials for coil iron core that require stress relief annealing in manufacturing processes. For example, JP H06-22179 B (PTL 1) proposes a technique of introducing linear grooves with a width of 300 μm or less and a depth of 100 μm or less on the surface of a steel sheet so that the iron loss is reduced from 0.80 W/kg or more to 0.70 W/kg or less after the formation of the linear grooves.

Examples of methods of forming grooves on a grain-oriented electrical steel sheet include an electrolytic etching method in which grooves are formed on the surface of a steel sheet by electrolytic etching (JP 2012-77380 A (PTL 2)), a laser method in which a high-output laser is used to locally melt and vaporize a steel sheet (JP 2003-129135 A (PTL 3)), and a gear pressing method in which a gear-shaped roller is pressed against a steel sheet to imprint indentation (JP S62-86121 A (PTL 4)).

CITATION LIST

Patent Literature

PTL 1: JP H06-22179 B
PTL 2: JP 2012-77380 A
PTL 3: JP 2003-129135 A
PTL 4: JP S62-86121 A
PTL 5: JP 2008-57001 A

SUMMARY

Technical Problem

As described above, the iron loss properties of recent grain-oriented electrical steel sheets have been greatly improved by a combination of the above methods, particularly by the high orientation and the magnetic domain refining. However, when a grain-oriented electrical steel sheet thus produced has been processed into a transformer, there is a known problem that the building factor deteriorates due to the influence of high orientation, and the low iron loss properties of the material cannot be fully utilized. As used herein, the building factor (BF) is a ratio of the iron loss of the transformer to the iron loss of the electrical steel sheet as a material. When the value of the building factor gets close to 1, it means the iron loss properties of the transformer improves. One of the factors that increase the building factor is the rotational iron loss at joints between electrical steel sheets when they are assembled as a transformer. As used herein, the rotational iron loss refers to the iron loss caused in an electrical steel sheet as a material when a rotating magnetic flux, in which the direction and magnitude of magnetization are changed in an elliptical shape with its major axis in the rolling direction, is applied.

As a method of reducing the building factor, JP 2008-57001 A (PTL 5) proposes a method of scattering thickness-reducing portions in the gap between grooves in a grain-oriented electrical steel sheet having a plurality of grooves in a direction crossing the rolling direction. This method can reduce the rotational iron loss of a grain-oriented electrical steel sheet, which is considered to be one of the causes of a high building factor, but the introduction of thickness-reducing portions in the steel sheet reduces the cross-sectional area in the thickness direction of the steel sheet, which inevitably leads to a decrease in magnetic flux density.

Therefore, to develop a heat resistant magnetic domain refined material for transformers with better properties, it is necessary to develop a groove formation pattern with which both an effect of reducing the building factor and a high magnetic flux density can be obtained. It could thus be helpful to provide a linear groove formation pattern with which both an effect of reducing the building factor and a high magnetic flux density can be obtained.

Solution to Problem

We made intensive studies to solve the above problems.
First, we studied the method of scattering thickness-reducing portions between linear grooves (hereinafter also referred to as "non-grooved portion") according to PTL 5.

In a grain-oriented electrical steel sheet, the direction of easy magnetization is highly concentrated in the rolling direction. As a result, extremely large loss (rotational iron loss) occurs when there is a rotating magnetic flux in which the magnetization direction and magnitude rotate in an elliptical shape with its major axis in the rolling direction, as described above. Such a rotating magnetic flux occurs at joints, especially in a transformer iron core. On the other hand, the iron loss of a material is iron loss caused when an AC magnetic field with magnetization components is applied only in the rolling direction. Therefore, when the material is assembled as a transformer, an increase in the rotational iron loss of an electrical steel sheet as the material leads to an increase in the iron loss of the transformer relative to the iron loss of the material, that is, an increase in the building factor. Therefore, to improve the building factor properties of the transformer, it is necessary to reduce the rotational iron loss, that is, to facilitate the rotation of magnetization.

Further, in a grain-oriented electrical steel sheet with grooves, the formation of grooves improves the iron loss properties, but it also causes a local reduction in cross-sectional area due to the presence of the groove. This causes a concentration of magnetic flux at the floor of the groove, leading to deterioration of magnetic properties such as magnetic permeability and iron loss. Therefore, the effect of reduction in cross-sectional area due to the formation of grooves should also be minimized.

To solve the problems, we first studied a method of reducing rotational iron loss. As a result, it was found that the rotation of magnetization can be facilitated by forming magnetic domains with a magnetization direction different from the rolling direction (hereinafter referred to as "auxiliary magnetic domain") in the non-grooved portion. We also found that such an auxiliary magnetic domain tends to be formed starting from a defect that disrupts the magnetic flux continuity in the non-grooved portion.

We further examined the most favorable distribution of the defect. The defect may be a convex part, a recessed part, local distortion, or the like. Among the above, a convex part is inappropriate for transformer iron core applications because it deteriorates the stacking factor, and local distortion is inappropriate because it loses its effect due to stress relief annealing after the formation of a coil iron core. Further, the formation of a convex part or local distortion is undesirable because it requires additional processing equipment. On the other hand, a recessed part is considered suitable because it causes no problem described above and the manufacturing can be performed with current grooving processes. However, the formation of a recessed part means a reduction in local cross-sectional area, which, as described above, may deteriorate the magnetic permeability and the iron loss properties.

We then studied a formation pattern in which a recessed part is formed without deteriorating the magnetic properties of a steel sheet, and we newly found that it is effective to introduce a discontinuous portion in a continuous linear groove in addition to a recessed part (defect) in the non-grooved portion. FIG. 1A schematically illustrates a common grain-oriented electrical steel sheet with linear grooves, and FIG. 1B schematically illustrates the newly discovered groove formation pattern. Comparing FIG. 1A and FIG. 1B, the new groove formation pattern is different from the conventional groove formation pattern in that recessed defects, which are defects caused by recessed parts, are scattered in the non-grooved portion, and that a discontinuous portion is formed where a linear groove extending in a direction orthogonal to the rolling direction is disrupted and no groove is not formed. In FIG. 1B, recessed defects are formed in the non-grooved portion between the linear grooves. Note that, although no recessed defect is illustrated in a non-grooved portion outside the non-grooved portion, which is a non-grooved portion between a linear groove and the edge of the sheet in the figure, it is certainly possible to form a recessed defect in this non-grooved portion. In any case, it suffices to satisfy the requirements for the recessed part as described below.

As described above, in the present disclosure, a groove formed in a linear shape on a steel sheet is called a "linear groove", a portion where a linear groove is disrupted is called a "discontinuous portion", an area between adjacent linear grooves is called a "non-grooved portion", and a defect caused by a recessed part in a non-grooved portion is called a "recessed defect", respectively.

The present disclosure is based on the above findings. We thus provide the following.

[1] A grain-oriented electrical steel sheet, comprising a plurality of linear grooves extending in a direction crossing a rolling direction of the steel sheet on a surface of the steel sheet, wherein
a surface of the steel sheet between the linear grooves has a recessed defect that is recessed from the surface,
a volume fraction of the recessed defect in the steel sheet is 0.0025 vol % or more and 0.01 vol % or less of a steel sheet without the recessed defect, and
discontinuous portions that disrupt the extension of the linear grooves are provided at a frequency of 30 or more and 200 or less per square meter of the steel sheet.

[2] The grain-oriented electrical steel sheet according to [1], wherein the recessed defect is provided at a frequency of 1 or more and 50 or less per square millimeter.

[3] The grain-oriented electrical steel sheet according to [1] or [2], wherein a length of the discontinuous portion of the linear groove along the extending direction is 50% or less of an average width of the linear groove.

[4] The grain-oriented electrical steel sheet according to any one of [1] or [3], wherein the number of the discontinuous portions in every one of the linear grooves is 5 or less for one meter length of the linear groove.

Advantageous Effect

According to the present disclosure, it is possible to provide a heat resistant magnetic domain refined grain-oriented electrical steel sheet with linear grooves that has an effect of reducing the building factor more than ever when assembled as a transformer iron core while suppressing the deterioration of magnetic properties more than ever.

DETAILED DESCRIPTION

First, the experimental results that led to the present disclosure are described.

Experiment 1

Figure 1A:
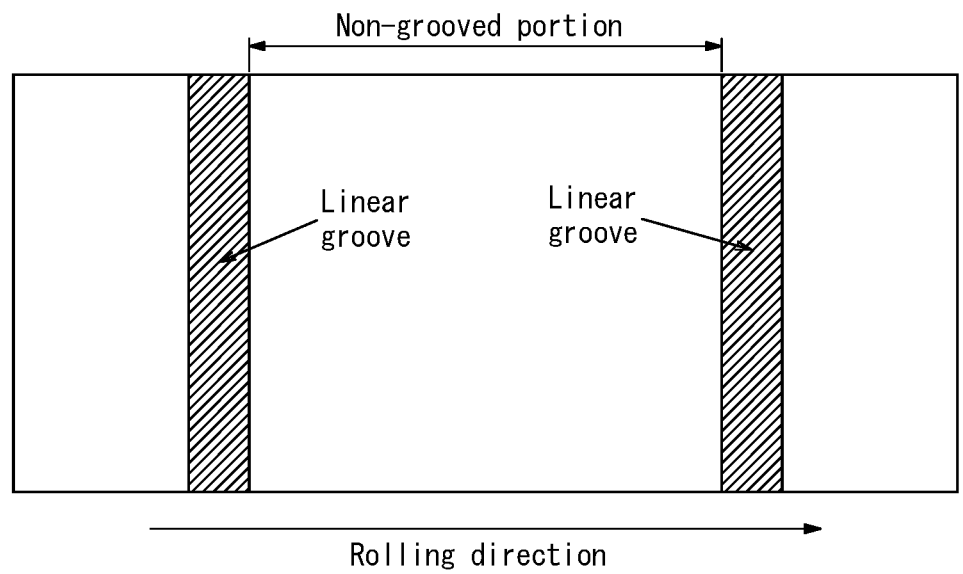
FIG. 1A schematically illustrates the introduction of linear groove.

A cold-rolled steel strip of a grain-oriented electrical steel sheet with a thickness of 0.23 mm and a sheet width of 1 m was used as a test piece. After applying a resist coating all over the surface of the test piece, patterning was performed on the coating using a laser (to form non-coated portions by partially stripping the resist coating, which is hereinafter also referred to as "laser patterning"). Specifically, laser patterning was performed such that non-coated portions extending at a width of 100 µm and inclined at an angle of 10 degrees with respect to a direction orthogonal to the rolling direction (sheet transverse direction) were arranged at intervals of 3 mm (groove pitch) in the rolling direction. After the patterning, the test piece was subjected to electrolytic etching under electrolytic conditions that formed grooves with a depth of 20 µm in the non-coated portions, to form linear grooves as illustrated in FIG. 1A in the non-coated portions. The average width of the resulting linear grooves was 100 µm. Next, the resist coating was removed, and then the test piece was weighed. The result was weight A.

Figure 1B:
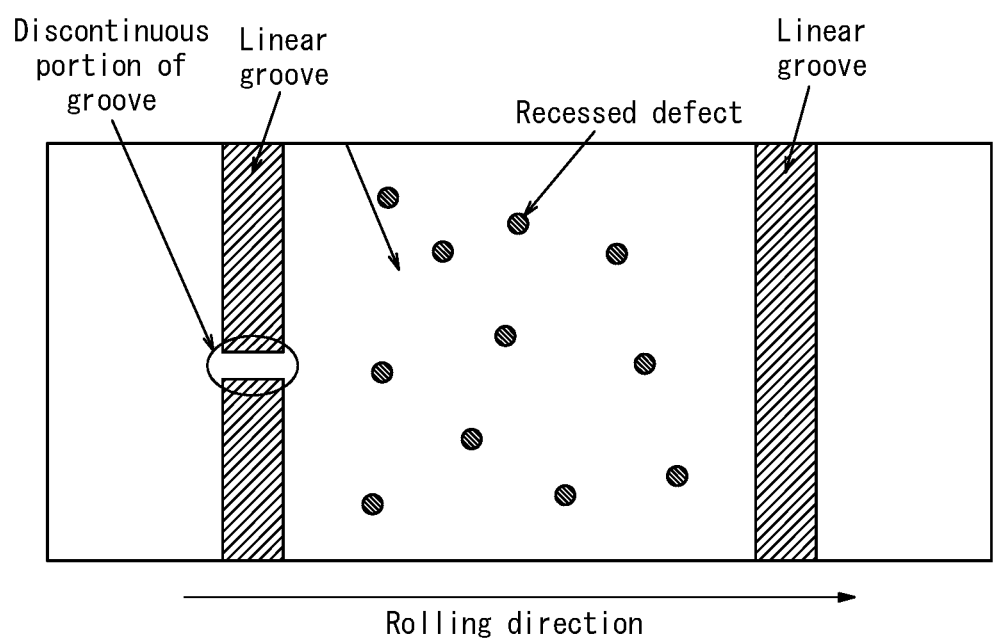
FIG. 1B schematically illustrates the introduction of linear groove and recessed defect.

Further, a resist coating was applied to the surface of the test piece, and laser patterning was performed to form a large number of point-like non-coated portions to locally strip the resist coating (dots with a diameter of 20 µm) so that point-like recessed defects with a diameter of 20 µm were formed in a non-grooved portion between the linear grooves. Next, electrolytic etching was performed to form recessed defects in the point-like non-coated portions as illustrated in FIG. 1B. Next, the resist coating was removed, and then the test piece was weighed. The result was weight B.

The weight loss due to the recessed defects of the test piece was calculated from the weight A and the weight B, and the result was converted to a volume fraction using the density of the steel sheet of 7.65 g/cm$^3$. The number of the recessed defects per square millimeter was adjusted by adjusting the conditions of the laser patterning, and the depth of the recessed defect was adjusted by adjusting the time of the electrolytic etching.

The grain-oriented electrical steel sheet cold-rolled steel strips with various groove patterns as described above were subjected to decarburization annealing, final annealing, and flattening annealing, and applied with an insulating tension coating, to obtain steel sheets as a finished product. For comparison, a grain-oriented electrical steel sheet as a finished product in which only linear grooves were formed without forming the recessed defects was also prepared.

A part was cut from the steel sheet as a finished product thus obtained, and $B_8$ and $W_{17/50}$ were measured as magnetic properties with the Epstein's method described in JIS C2550. In addition, a 3-phase stacked transformer (iron core weight 500 kg) was prepared with the steel sheet as a finished product, and the iron loss properties were measured at a frequency of 50 Hz when the magnetic flux density in the iron core leg portion was 1.7 T. The iron loss properties at 1.7 T and 50 Hz were measured using a wattmeter to determine the no-load loss. The building factor was calculated from the result and the $W_{17/50}$ value measured earlier in the Epstein test.

Figure 2:
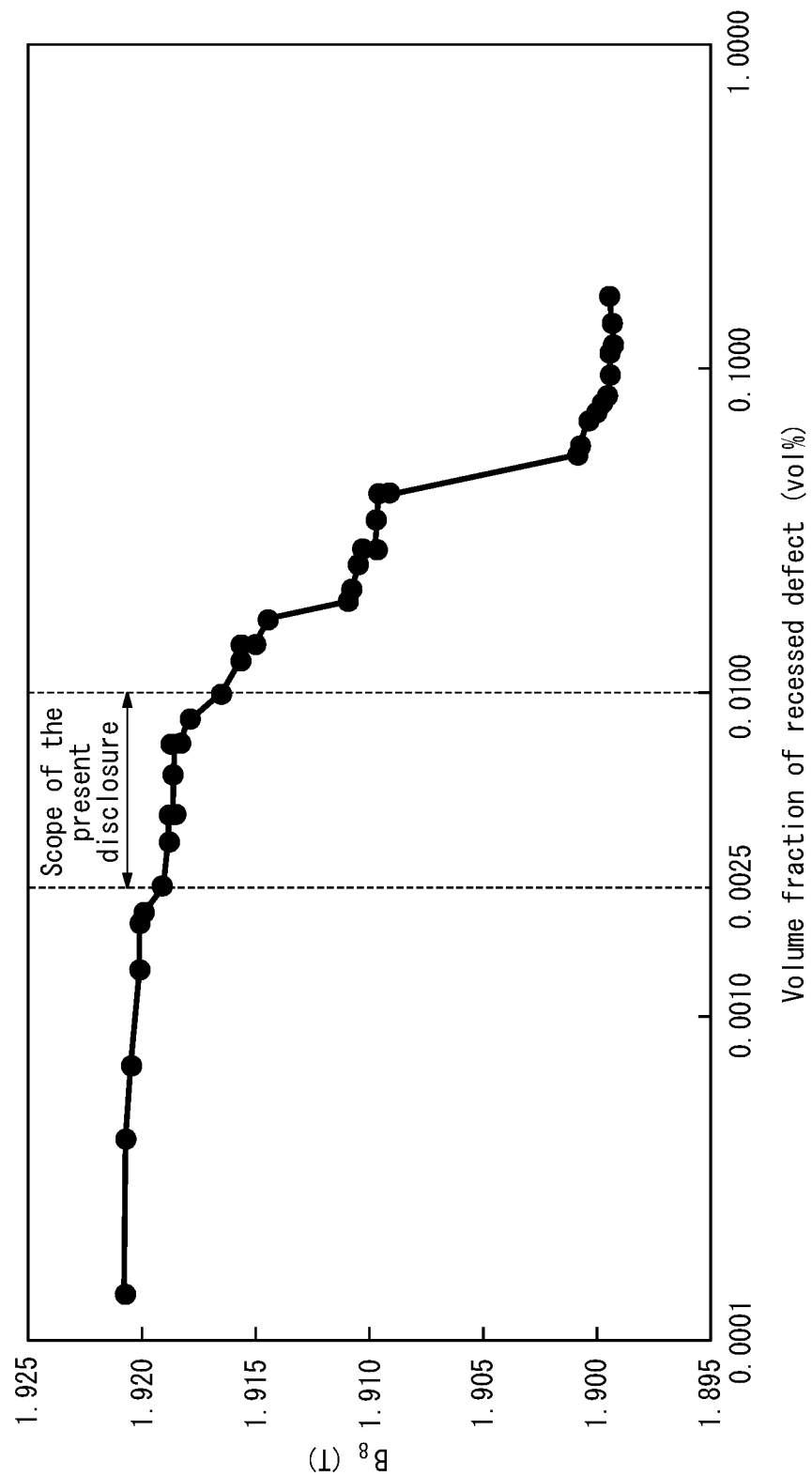
FIG. 2 illustrates the relationship between the volume fraction of the recessed defect and the magnetic flux density.
Figure 3:
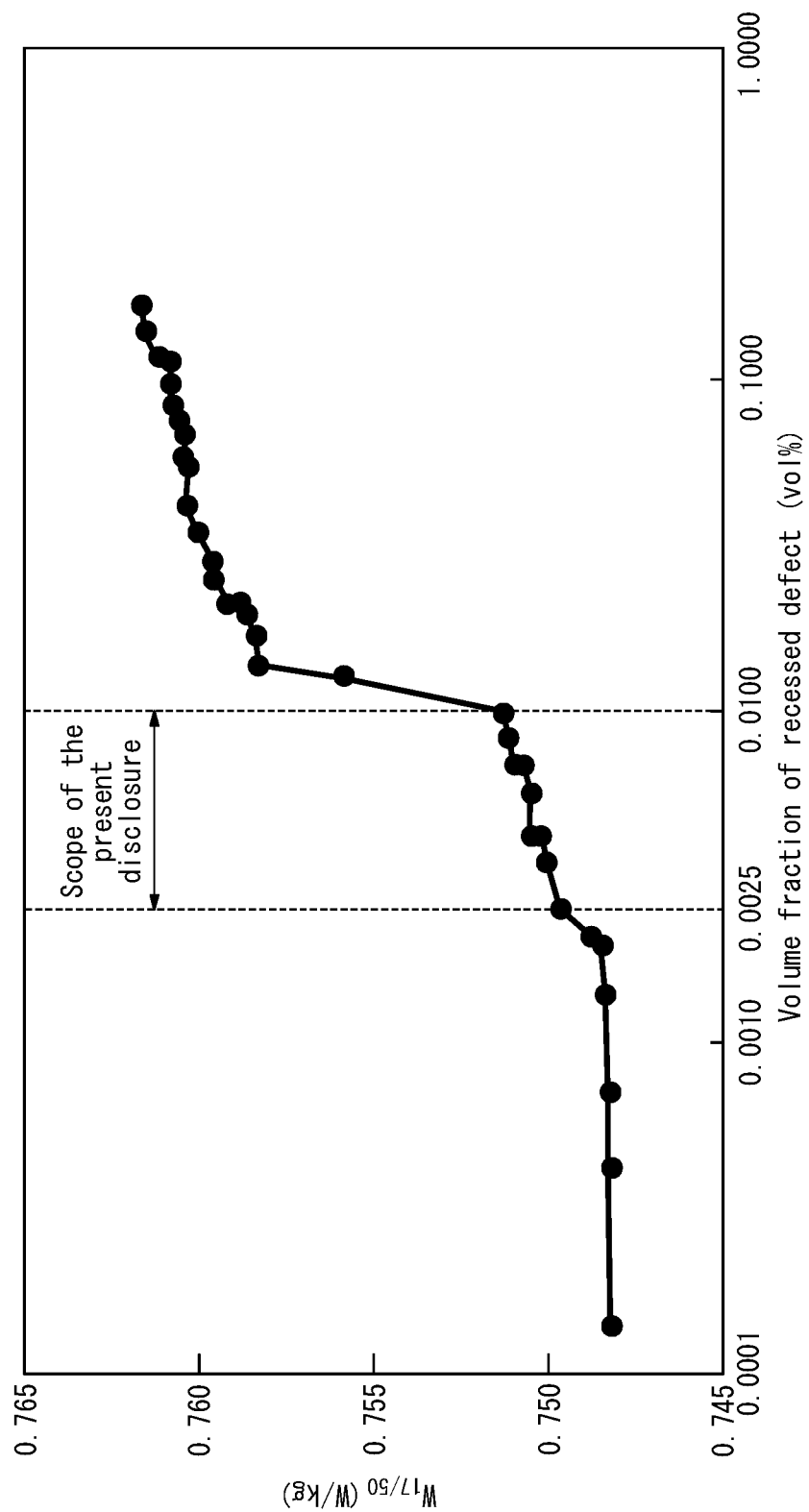
FIG. 3 illustrates the relationship between the volume fraction of the recessed defect and the iron loss.
Figure 4:
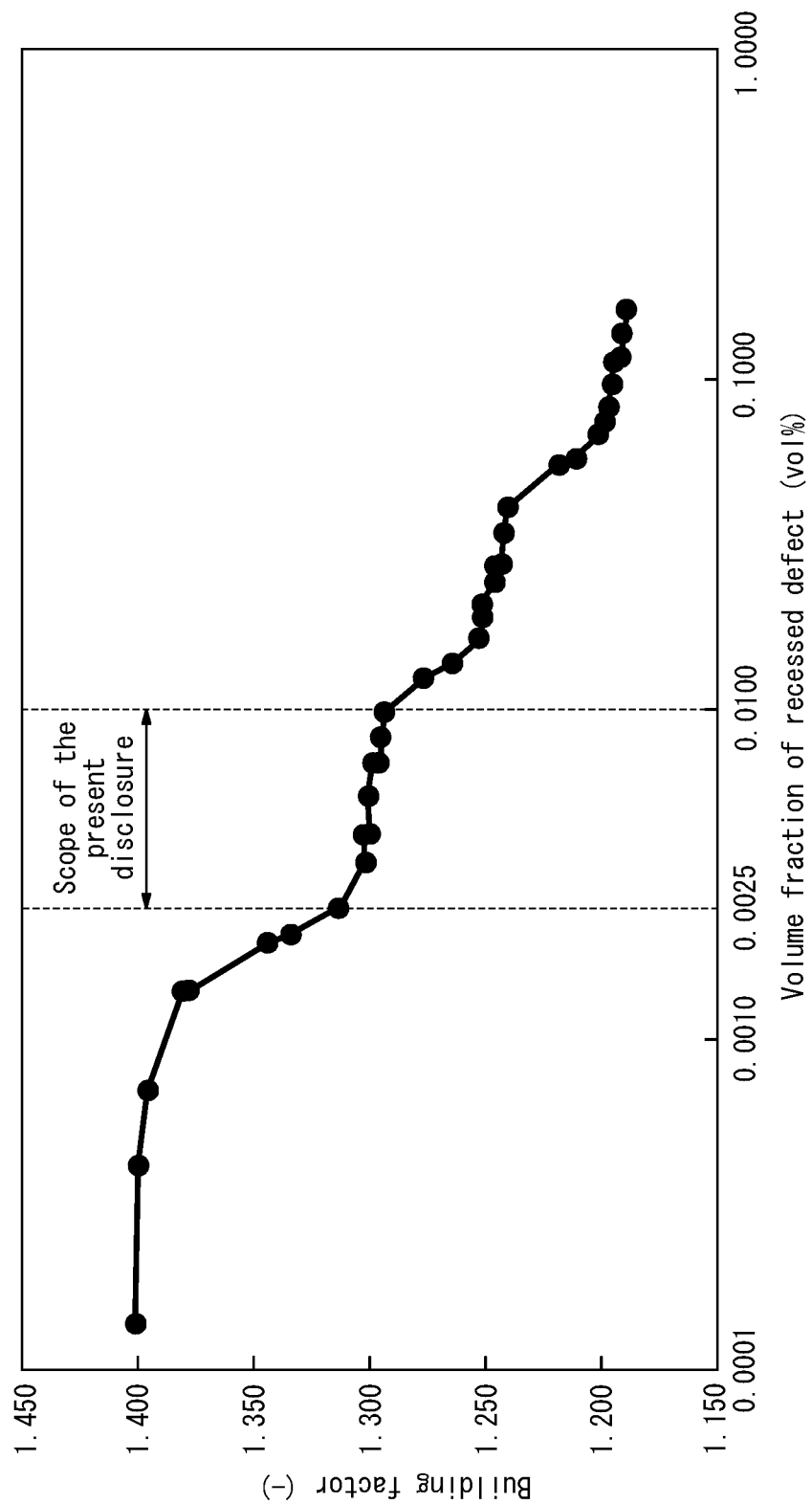
FIG. 4 illustrates the relationship between the volume fraction of the recessed defect and the building factor.

The measurement results are illustrated in FIGS. 2 to 4. First, as illustrated in FIG. 2, it was confirmed that $B_8$ deteriorates slightly when the volume fraction of the recessed defect is 0.0025 vol % or more, and that $B_8$ deteriorates significantly when the volume fraction of the recessed defect exceeds 0.0100 vol %. This is probably because the magnetic permeability is deteriorated due to an increase in the volume fraction of the recessed defect. As illustrated in FIG. 3, it was also confirmed that the iron loss $W_{17/50}$ increases sharply when the volume fraction of the recessed defect exceeds 0.0100 vol %. This is probably because the domain wall displacement is hindered by the recessed defects. On the other hand, as illustrated in FIG. 4, the building factor properties tend to be improved as the volume fraction of the recessed defect increases, and the improvement is particularly significant when the volume fraction of the recessed defect is 0.0025 vol % or more. This is probably because the rotational iron loss, which is one of the factors that increase the building factor, is suppressed by the introduction of the defect.

Summarizing the above results, an effective range of the volume fraction of the recessed defect that can improve both the magnetic properties and the building factor properties of the steel sheet is 0.0025 vol % or more and 0.01 vol % or less. It is more preferably 0.003 vol % or more and 0.008 vol % or less.

Experiment 2

Next, test pieces were prepared with the same method as above, but the patterning conditions were adjusted so that the above-described discontinuous portion (see FIG. 1B) was formed in each linear groove during the patterning in which the linear grooves were formed. In this process, patterning was performed to form non-coated portions for grooves so that the number of the discontinuous portions per square meter would vary. In addition, patterning conditions and electrolysis conditions were fixed so that the volume fraction of the recessed defect was constant at 0.005 vol % in each test piece, and samples were prepared under these conditions. The magnetic properties ($B_8$ and $W_{17/50}$) were measured in the same manner as in Experiment 1. In addition, a 3-phase stacked transformer (iron core weight 500 kg) was prepared with the steel sheet as a finished product in the same process as above, and the iron loss properties were measured at a frequency of 50 Hz when the magnetic flux density in the iron core leg portion was 1.7 T. The iron loss properties at 1.7 T and 50 Hz were measured using a wattmeter to determine the no-load loss. The building factor was calculated from the result and the $W_{17/50}$ value measured earlier in the Epstein test.

Figure 5:
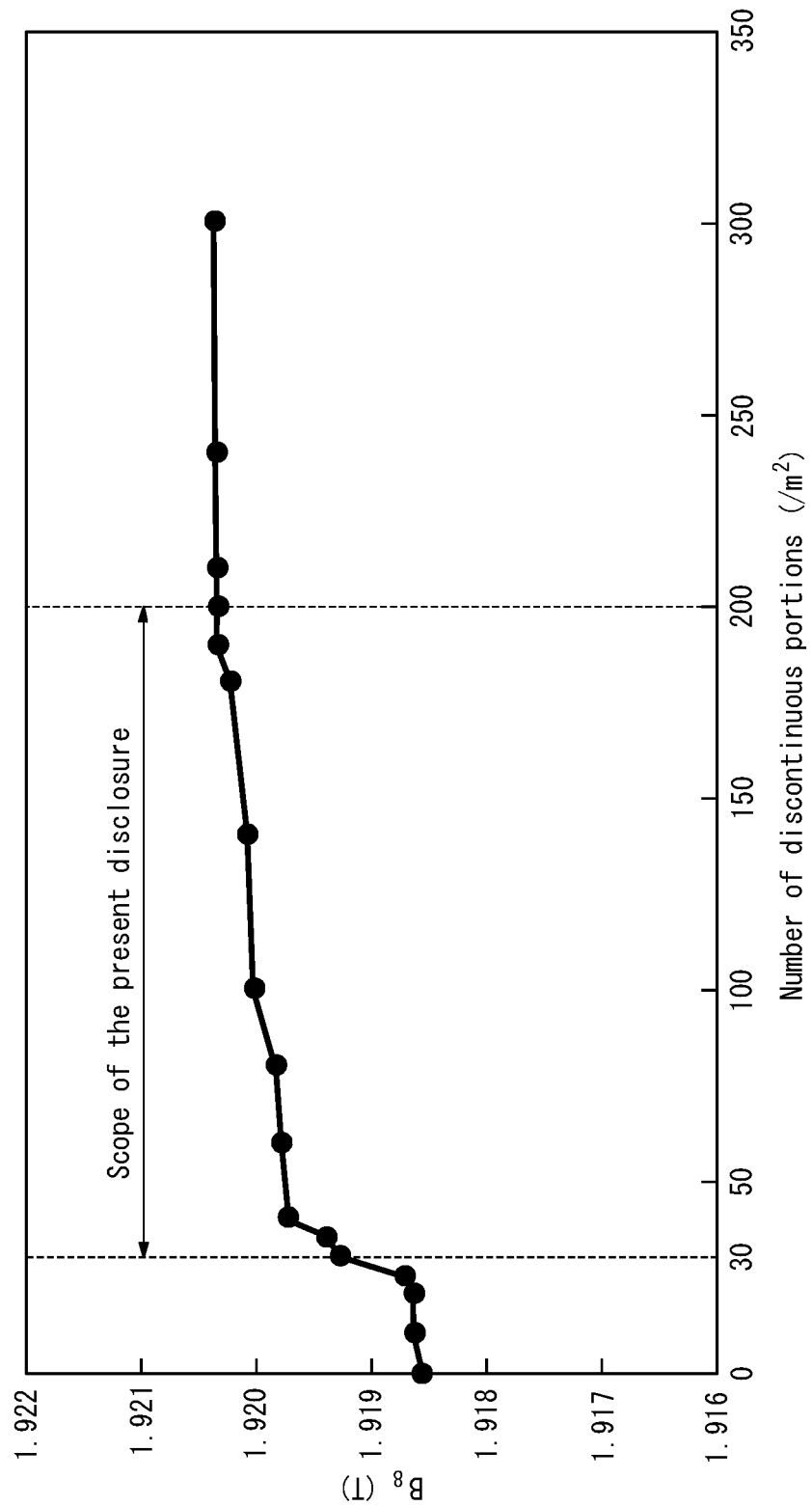
FIG. 5 illustrates the relationship between the number of the discontinuous portions in the groove and the magnetic flux density.
Figure 6:
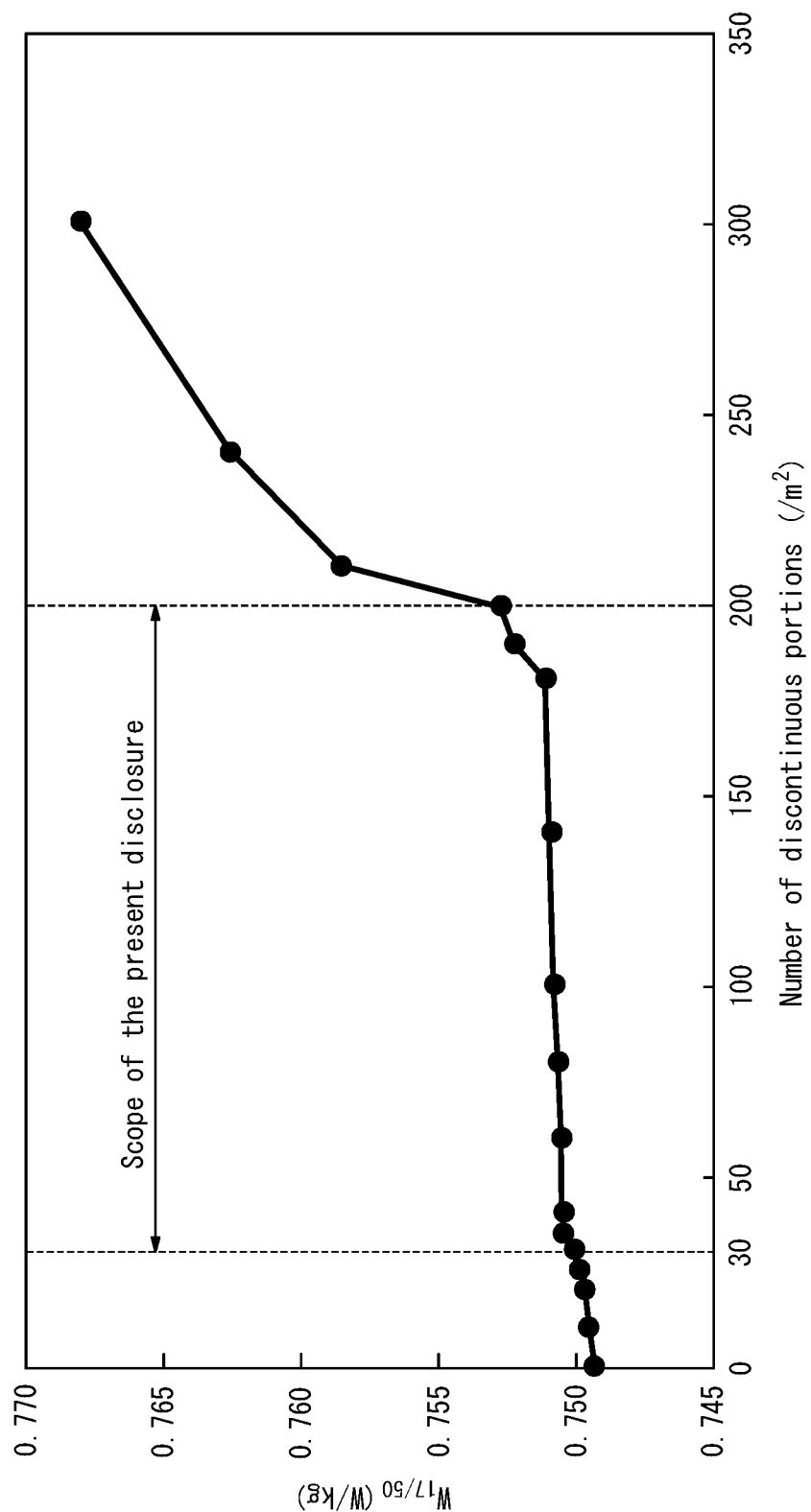
FIG. 6 illustrates the relationship between the number of the discontinuous portions in the groove and the iron loss.
Figure 7:
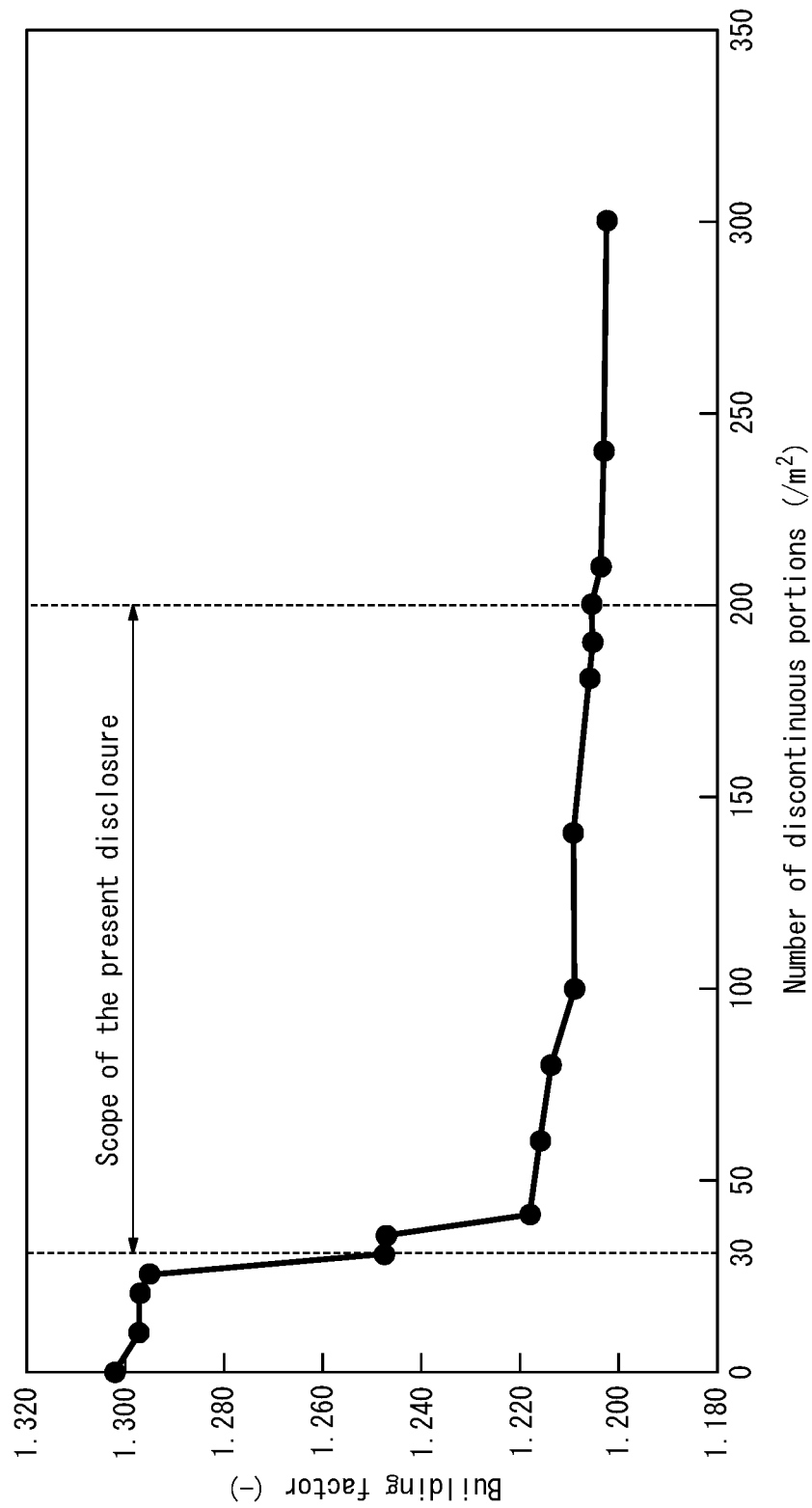
FIG. 7 illustrates the relationship between the number of the discontinuous portions in the groove and the building factor.

The measurement results are illustrated in FIGS. 5 to 7. As illustrated in FIG. 5, $B_8$ is improved in a region where the number of the discontinuous portions in the groove is 30/m$^2$ or more. This is probably because the cross-sectional area of the steel sheet is locally increased at the discontinuous portions, so that the magnetic permeability, which has been deteriorated due to the introduction of the recessed defect, recovers. An improvement in building factor properties can also be confirmed, as illustrated in FIG. 7. This is probably because an auxiliary magnetic domain is formed starting from the discontinuous portion, and the rotational iron loss is reduced. On the other hand, deterioration in iron loss properties is observed when the number of the discontinuous portions exceeds 200/m², as illustrated in FIG. 6. This is probably because the magnetic domain refining effect of the groove decreases as the number of the discontinuous portions increases.

Summarizing the above results, an effective range of the number of the discontinuous portions in the groove that can improve both the magnetic properties and the building factor properties of the steel sheet is 30/m² or more and 200/m² or less. It is more preferably 40/m² or more and 180/m² or less.

Experiment 3

Next, a suitable distribution of the discontinuous portion and the recessed defect was examined.

When preparing test pieces in the same process as above, the patterning conditions and the electrolytic conditions were adjusted so that the length of the discontinuous portion in the extending direction of the groove, the number of the discontinuous portions per meter of one linear groove, and the frequency of the recessed defect in 1 mm² of the non-grooved portion were variously changed, and the total number of the discontinuous portions was 50/m² and the volume fraction of the recessed defect was 0.005 vol %, and samples were prepared in the same process as in Experiment 1. The magnetic properties ($B_8$ and $W_{17/50}$) of the obtained samples were measured in the same manner as in Experiment 1. In addition, a 3-phase stacked transformer (iron core weight 500 kg) was prepared with the steel sheet as a finished product in the same process as above, and the iron loss properties were measured at a frequency of 50 Hz when the magnetic flux density in the iron core leg portion was 1.7 T. The iron loss properties at 1.7 T and 50 Hz were measured using a wattmeter to determine the no-load loss. The building factor was calculated from the result and the $W_{17/50}$ value measured earlier in the Epstein test.

Figure 8:
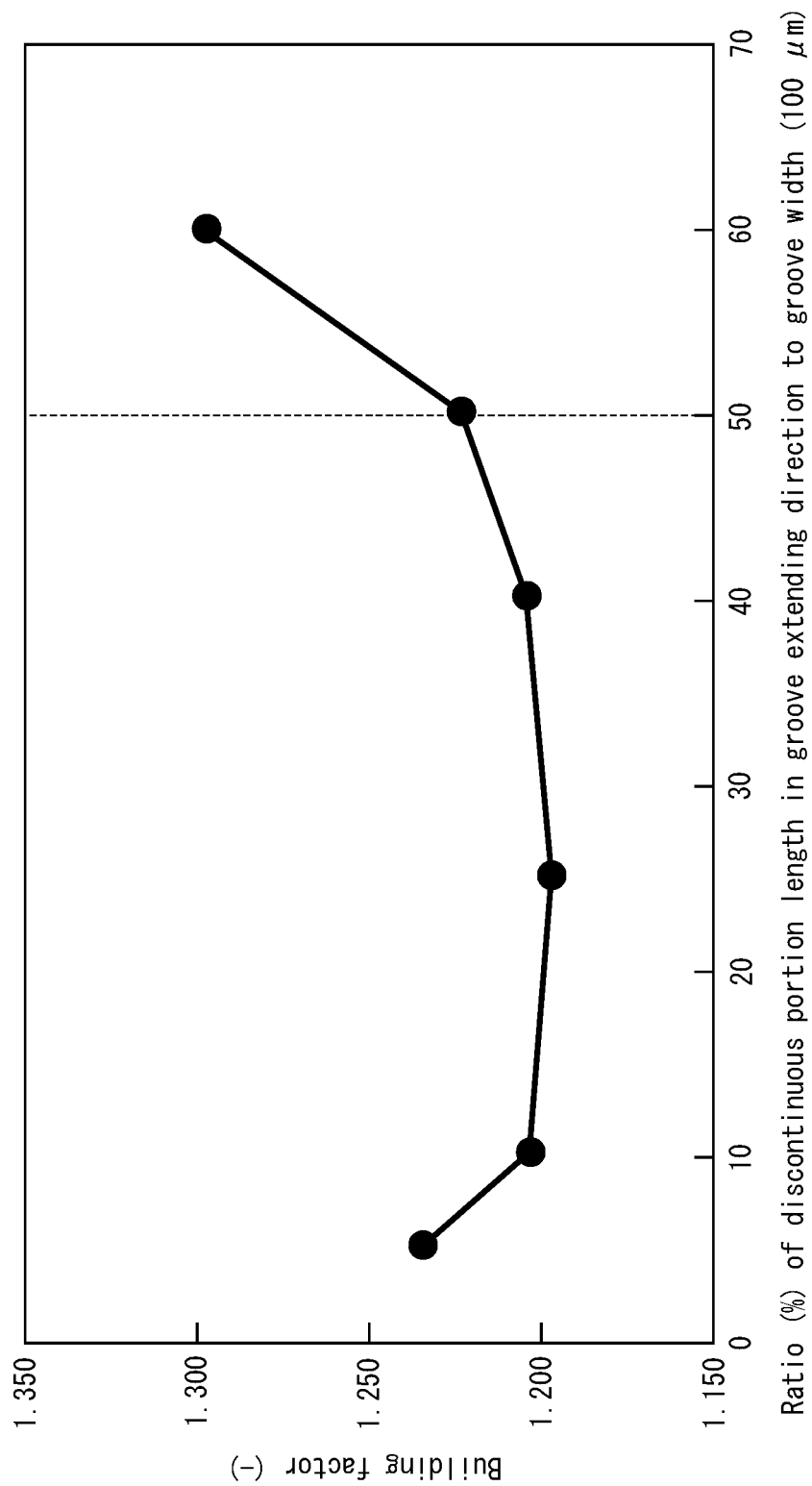
FIG. 8 illustrates the relationship between the length of the discontinuous portion in the groove and the building factor.
Figure 9:
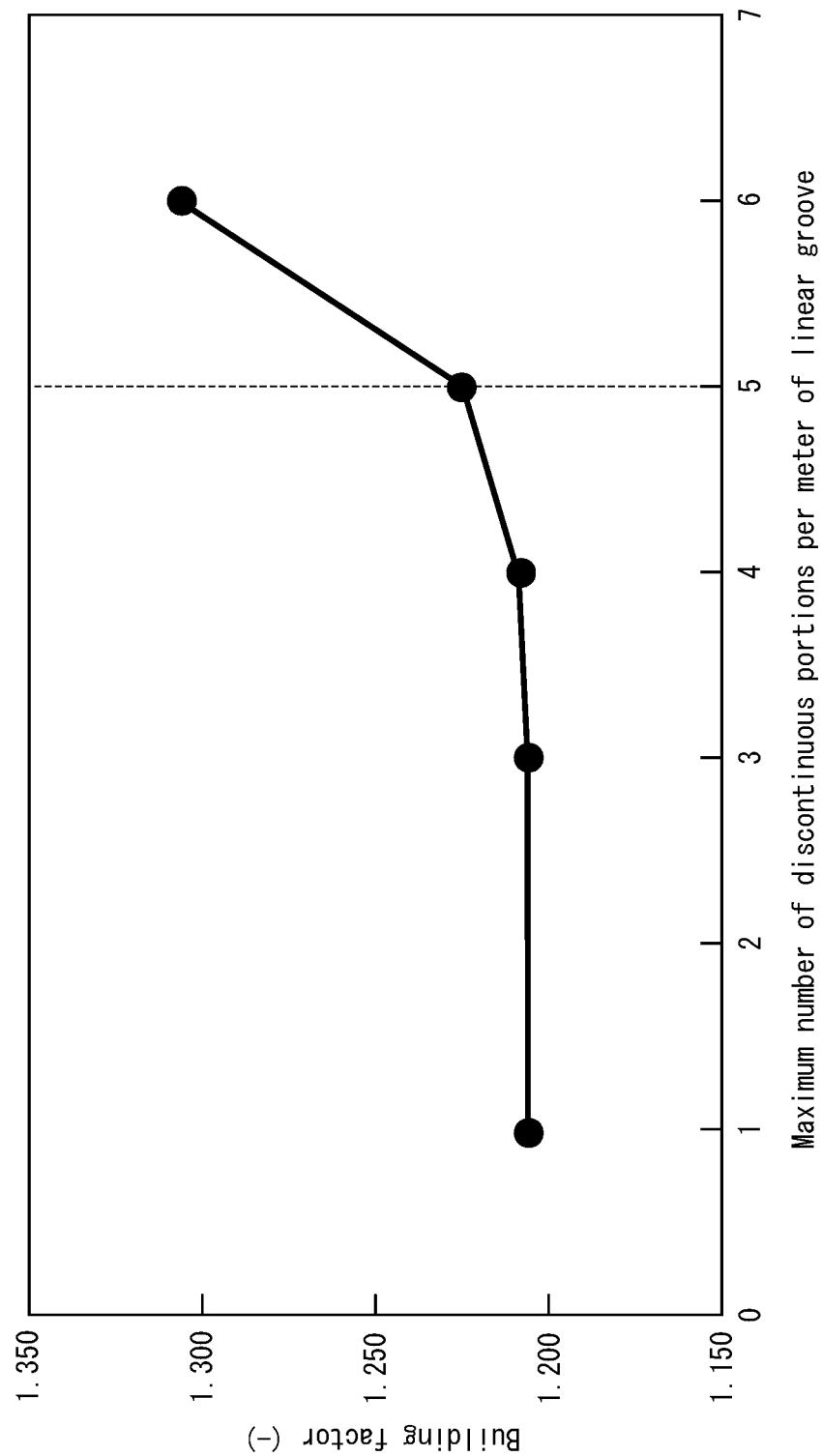
FIG. 9 illustrates the relationship between the number of the discontinuous portions per meter of the groove and the building factor.
Figure 10:
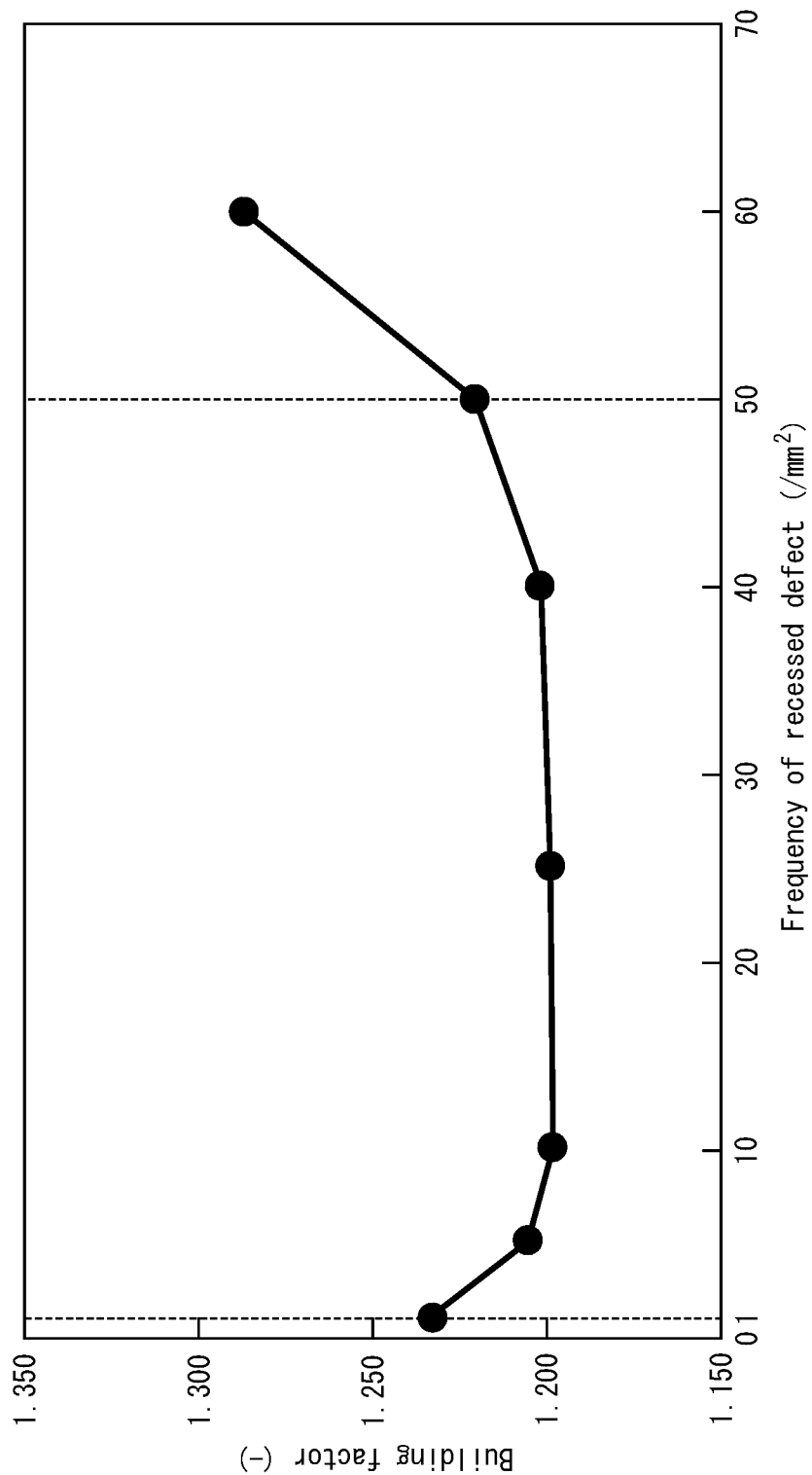
FIG. 10 illustrates the relationship between the ratio of the recessed defect and the building factor.

The measurement results are illustrated in FIGS. 8 to 10. The results illustrated in these figures indicate that, with the same number of the discontinuous portions and the same volume fraction of the recessed defect, a higher building factor improving effect can be confirmed when the length of the discontinuous portion in the extending direction of the groove is 50% or less of the average width of the groove, the maximum number of the discontinuous portions per meter of one linear groove is 5 or less, and the frequency of the recessed defect is 1 or more and 50 or less per square millimeter of the non-grooved portion. The length of the discontinuous portion in the extending direction of the groove is more preferably 10% or more and 40% or less of the average width of the groove, the maximum number of the discontinuous portions per meter of one linear groove is more preferably 4 or less, and the frequency of the recessed defect is more preferably 5 or more and 40 or less per square millimeter of the non-grooved portion.

Although the detailed cause of the above effect is unknown, we presume as follows. By controlling the distribution of the recessed defect and the discontinuous portion in the above ranges, the distribution of the initiation point of auxiliary magnetic domain is optimized, and the building factor properties, that is, the rotational iron loss properties are improved more efficiently.

The following describes a suitable embodiment of the present disclosure in detail. Note that the present disclosure is not limited to the configuration disclosed in the embodiment, and various modifications can be made without departing from the scope of the present disclosure.

[Grain-Oriented Electrical Steel Sheet]

The chemical composition of a slab, which is material of a grain-oriented electrical steel sheet, in the present disclosure is a chemical composition capable of secondary recrystallization. In the case of using an inhibitor, for example, Al and N are added in appropriate amounts when using a AlN-based inhibitor, and Mn and Se and/or S are added in appropriate amounts when using a MnS/MnSe-based inhibitor. Both inhibitors may be used together. In this case, the preferred contents of Al, N, S, and Se are Al: 0.010 mass % to 0.065 mass %,
N: 0.0050 mass % to 0.0120 mass %,
S: 0.005 mass % to 0.030 mass %, and
Se: 0.005 mass % to 0.030 mass %, respectively.

An inhibitor-less grain-oriented electrical steel sheet in which the contents of Al, N, S, and Se are limited may be used in the present disclosure. In this case, the contents of Al, N, S, and Se are each preferably suppressed to Al: 0.010 mass % or less,
N: 0.0050 mass % or less,
S: 0.0050 mass % or less, and
Se: 0.0050 mass % or less.

The following describes the basic components and optionally added components of a steel material (slab) for a grain-oriented electrical steel sheet of the present disclosure in detail. C: 0.08 mass % or less C is added to improve the microstructure of a hot-rolled sheet. When the C content is more than 0.08 mass %, it is difficult to reduce the C content during the manufacturing processes to 50 mass ppm or less with which no magnetic aging will occur. Therefore, the C content is desirably 0.08 mass % or less. Because secondary recrystallization occurs even in a steel material containing no C, there is no need to set a lower limit for the C content. Therefore, the C content may be 0 mass %.

Si: 2.0 mass % to 8.0 mass % Si is an element effective in increasing the electric resistance of steel and improving the iron loss properties. Therefore, the Si content is preferably 2.0 mass % or more. On the other hand, when the Si content exceeds 8.0 mass %, the workability and the sheet passing properties deteriorate, and the magnetic flux density also decreases. Therefore, the Si content is desirably 8.0 mass % or less. It is more preferably 2.5 mass % to 7.0 mass %.

Mn: 0.005 mass % to 1.0 mass %

Mn is an element necessary for improving the hot workability. Therefore, the Mn content is preferably 0.005 mass % or more. On the other hand, when the Mn content exceeds 1.0 mass %, the magnetic flux density deteriorates. Therefore, the Mn content is preferably 1.0 mass % or less. It is more preferably 0.01 mass % to 0.9 mass %.

In addition to the basic components described above, at least one selected from the following optionally added components, which are known to be effective in improving magnetic properties, can be contained alone or in combination as needed, Ni: 0.03 mass % to 1.50 mass %,
Sn: 0.01 mass % to 1.50 mass %,
Sb: 0.005 mass % to 1.50 mass %,
Cu: 0.03 mass % to 3.0 mass %,
P: 0.03 mass % to 0.50 mass %,
Mo: 0.005 mass % to 0.10 mass %, and
Cr: 0.03 mass % to 1.50 mass %.

Ni is useful for improving the microstructure of a hot-rolled sheet and improving the magnetic properties. When the Ni content is less than 0.03 mass %, the contribution to magnetic properties is small. On the other hand, when the Ni content exceeds 1.50 mass %, secondary recrystallization becomes unstable, and the magnetic properties deteriorate. Therefore, the Ni content is desirably in a range of 0.03 mass % to 1.50 mass %.

Sn, Sb, Cu, P, Mo and Cr are also elements that improve the magnetic properties. In any case, when the content is less than the lower limit, the effect is insufficient, and when the content exceeds the upper limit, the growth of secondary recrystallized grains is suppressed, resulting in deterioration of magnetic properties. Therefore, the content of each component is preferably in the range described above.

The balance other than the above components is Fe and inevitable impurities.

C is decarburized during primary recrystallization annealing, and Al, N, S, and Se are purified during secondary recrystallization annealing. Therefore, these components are reduced to the level of inevitable impurities in a steel sheet after secondary recrystallization annealing (a grain-oriented electrical steel sheet after final annealing).

After subjecting a steel material (slab) of a grain-oriented electrical steel sheet with the above chemical system to hot rolling, hot-rolled sheet annealing is performed as required. Next, cold rolling is performed once or twice or more with intermediate annealing in between to obtain a steel strip with a final sheet thickness. The steel strip is then subjected to decarburization annealing, applied with an annealing separator consisting mainly of MgO, then rolled into a coil, and subjected to final annealing for the purpose of secondary recrystallization and formation of forsterite film. The steel strip after final annealing is subjected to flattening annealing, and then a magnesium phosphate-based tension coating is formed to obtain a product sheet.

In the present disclosure, linear grooves are formed on the surface of the grain-oriented electrical steel sheet (steel strip) as described above. The linear grooves are preferably formed in any process after cold rolling and before applying an annealing separator.

[Method of Forming Linear Groove]

In the present disclosure, the linear grooves can be formed by using the gravure printing method or the ink jet printing method to print a resist pattern so that linear non-printed portions extending in a direction crossing the rolling direction of the steel sheet are provided and discontinuous portions are formed within the non-printed portions, and then forming linear grooves in the non-printed portions by electrolytic etching. Alternatively, the linear grooves can be formed by applying a resist ink all over the surface of the steel sheet to form resist on the steel sheet surface, then performing patterning (removing the resist) by laser irradiation so that linear resist-stripped portions extending in a direction crossing the rolling direction of the steel sheet are provided and discontinuous portions are formed within the resist-stripped portions, and then performing electrolytic etching on the exposed portions where the resist has been removed to form linear grooves. The formation of the linear groove is not limited to these methods.

The following specifically describes preferred conditions for the linear grooves and the recessed defects, other than the number of the discontinuous portions, the length of the discontinuous portion in the extending direction of the groove, the frequency of the recessed defect, and the volume fraction of the recessed defect described above.

[Linear Groove Dimension]

The following describes suitable dimensions of the linear groove of the present disclosure. As used herein, the dimensions of the linear groove mean, in addition to the groove width and the groove depth, the distance between the linear grooves periodically formed in the rolling direction of the grain-oriented electrical steel sheet (steel strip), and the angle formed between the extending direction of the linear groove and the sheet transverse direction (a direction orthogonal to the rolling direction). The appropriate range of the linear groove to be formed on the surface of the steel sheet in the present disclosure is determined in consideration of, for example, the deterioration of the magnetic permeability due to the increased groove volume, and the sheet passing properties.

Groove width: 10 μm to 300 μm

When the groove width in the rolling direction of the steel sheet increases, the deterioration of the magnetic permeability increases at the same groove depth. Therefore, a small groove width is preferred. Therefore, the groove width is preferably 300 μm or less. However, when the groove width is too small, the iron loss improving effect is reduced due to magnetic pole coupling at both ends of the groove. Therefore, the lower limit of the groove width is preferably 10 μm. It is more preferably 20 μm to 200 μm.

Groove depth: 4% to 25% of sheet thickness

When the surface area of the groove edge increases, in other words, when the depth of the formed groove increases, the iron loss improving effect by groove formation also increases. Therefore, it is preferable to form the groove with a depth of 4% or more of the sheet thickness. On the other hand, when the depth of the groove increases, the volume of the groove naturally increases, which tends to deteriorate the magnetic permeability. Further, fracture may occur from the groove when the sheet passes through the manufacturing line. Based on the above, it is preferable to set the upper limit of the groove depth to 25% of the sheet thickness. It is more preferably 5% to 20% of the sheet thickness.

Interval between linear grooves in steel sheet rolling direction: 1.5 mm to 10 mm As described above, the iron loss improving effect increases as the surface area of the groove edge increases. Therefore, when the grooves are formed in small intervals in the rolling direction, a good result can be obtained. However, as the interval between the linear grooves narrows, the volume fraction of the groove with respect to the steel sheet also increases, which deteriorates the magnetic permeability and increases the risk of occurrence of fracture during the operation. Therefore, it is preferable to set the interval between the grooves in the rolling direction (a direction orthogonal to the extending direction of the linear groove) to 1.5 mm to 10 mm. It is more preferably 2 mm to 8 mm.

Angle between linear groove and sheet transverse direction (direction orthogonal to rolling direction): within ±30°

The volume of the groove increases as the extending direction of the linear groove inclines from the sheet transverse direction, which tends to deteriorate the magnetic permeability. Therefore, the angle between the linear groove and the sheet transverse direction is preferably within ±30°. It is more preferably within ±20°.

Diameter of recessed defect: 5 μm to 300 μm

When the diameter of the recessed defect increases, the deterioration of the magnetic permeability and the inhibition of the domain wall displacement increase at the same depth of the recessed defect. Therefore, a small diameter is preferred. Therefore, the diameter of the recessed defect is preferably 300 μm or less. However, when the diameter of the recessed defect is too small, it is difficult to form auxiliary magnetic domains due to magnetic pole coupling at both ends of the linear groove, and the iron loss improving effect is reduced. Therefore, the lower limit of the diameter is preferably 5 lam. It is more preferably 10 μm or more and 200 μm or less.

As used herein, the diameter of the recessed defect means the equivalent circle diameter of the defect on the surface of the steel sheet.

Depth of recessed defect: 4% to 25% of sheet thickness

When the sidewall surface area of the defect increases, in other words, when the depth of the formed defect increases, the iron loss improving effect by the formation of the recessed defect also increases. Therefore, it is preferable to form the defect with a depth of 4% or more of the sheet thickness. On the other hand, when the depth of the defect increases, the volume of the recessed defect naturally increases, and the magnetic permeability tends to deteriorate. Further, there is a risk of occurrence of cracks starting from the recessed defects during the sheet passage. Based on the above, it is preferable to set the upper limit of the depth of the recessed defect to 25% of the sheet thickness. As used herein, the depth of the recessed defect is defined as the average value of the depth of the deepest portions of the obtained points in a depth profile of the recessed defect portion obtained by observing the surface of the steel sheet using a laser microscope.

The shape of the recessed part is not limited, but the inclination of the part (wall surface) that invades from the surface of the steel sheet into the recess is preferably as steep as possible from the viewpoint of forming a demagnetizing field. It is preferably 60 degrees or less and more preferably degrees or less with respect to the thickness direction.

[Various Measuring Methods for Linear Groove and Recessed Defect]

In the present disclosure, the width and the depth of the groove, the length of the discontinuous portion in the extending direction of the groove, and the frequency of the recessed defect are determined by observing the surface of the grain-oriented electrical steel sheet after the formation of a tension coating with an optical microscopy, and measuring the length of the portion and the number of the portions.

First, the surface of the steel sheet is observed with an optical microscopy, and the groove width is defined as the distance between two straight lines parallel to the extending direction of the groove and passing through the ends of the groove in the rolling direction in an obtained image.

To measure the groove depth, the surface of the steel sheet is observed using a laser microscope to obtain a depth profile of the groove portion along the extending direction. The average value of the depth of the deepest portions of the obtained points in the depth profile is taken as the groove depth.

Next, the length of the discontinuous portion in the extending direction of the groove is obtained by measuring the distance between tangents perpendicular to the extending direction and passing through the two ends of the disrupted groove portion.

Ideally, the volume fraction of the recessed defect is calculated with the weight A of the grain-oriented electrical steel sheet after the formation of the linear groove and the discontinuous portion in the groove and the weight B of the grain-oriented electrical steel sheet after the formation of the recessed defect, with the density of the steel sheet being 7.65 g/cm³. For convenience, the weight A' calculated from the measurement results of the shape and the frequency of the linear groove and the discontinuous portion in the groove may be used for the grain-oriented electrical steel sheet after the formation of the recessed defect.

The frequency of the discontinuous portion and the number of the discontinuous portions in one linear groove are measured by operating a laser distance meter along the extending direction of the groove for the linear groove on the grain-oriented electrical steel sheet after the formation of a tension coating.

[Method of Measuring Magnetic Properties]

The magnetic properties ($B_8$ and $W_{17/50}$) of the grain-oriented electrical steel sheet after the formation of an insulation tension coating are measured with the Epstein's method as described in JIS C2550. $B_8$ refers to the magnetic flux density of the sample when the sample is excited with a magnetizing force of 800 A/m in the rolling direction, and $W_{17/50}$ refers to the loss when AC magnetization of 1.7 T and 50 Hz is applied in the rolling direction of the sample.

In addition, a 3-phase stacked transformer (iron core weight 500 kg) was prepared with the steel sheet as a finished product, and the iron loss properties were measured at a frequency of 50 Hz when the magnetic flux density in the iron core leg portion was 1.7 T. The iron loss properties at 1.7 T and 50 Hz were measured using a wattmeter to determine the no-load loss. The building factor was calculated from the result and the $W_{17/50}$ value measured earlier in the Epstein test.

In addition to the above-described processes and manufacturing conditions, any known method of manufacturing a grain oriented electrical steel sheet in which linear grooves are formed and magnetic domain refining treatment is performed may be appropriately used in the present disclosure.

EXAMPLES

The following describes the present disclosure in detail based on examples. The following examples merely represent preferred examples, and the present disclosure is not limited to these examples. It is also possible to carry out the present disclosure by making modifications without departing from the scope and sprit of the present disclosure, and such modes are also encompassed by the technical scope of the present disclosure.

A grain-oriented electrical steel sheet material (slab) having the components listed in Table 1 where the balance was Fe and inevitable impurities was used in the examples.

TABLE 1

| Chemical composition (mass %) | | | | | | | | |
|---|---|---|---|---|---|---|---|---|
| C | Si | Mn | Ni | Al | N | Se | S | O |
| 0.08 | 3.4 | 0.1 | 0.01 | 0.0260 | 0.007 | 0.0110 | 0.003 | 0.0025 |

Example 1

A cold-rolled steel sheet of the grain-oriented electrical steel with a thickness of 0.23 mm was used as a test piece. A resist coating was applied all over the surface of the steel sheet, and then patterning was performed using a laser so that linear grooves could be formed, where the linear grooves had a groove width of 100 μm, the interval between the grooves in the rolling direction (inter-groove pitch) was 3 mm, and the inclination angle of the groove with respect to the sheet transverse direction of the steel sheet was 10 degrees. At this time, the irradiation pattern was controlled so that the number of discontinuous portions in the groove in 1 m² of the surface of the steel sheet was in a range of 0 to 300. After the patterning, the cold-rolled steel sheet was subjected to electrolytic etching to form linear grooves where the electrolytic conditions were set to have a groove depth of 20 μm. Next, the resist coating was removed, and then the sample sheet was weighed. The result was weight A. At this time, the patterning conditions were adjusted so that the length of the discontinuous portion in the extending direction of the groove was 40% of the groove width and the number of the discontinuous portions in one linear groove was 3.

A resist coating was applied again to the surface of the sample sheet in the same manner as above, conditions were adjusted to locally remove the resist coating so that a large number of recessed parts, where the diameter of one part was 50 μm and the depth of one part was 10 μm, were formed in a non-grooved portion, electrolytic etching was performed, and then the resist coating was removed. Next, the sheet was weighed, and the result was weight B. For each sample, the weight loss was calculated from the weight A and the weight B, and the result was converted to a volume fraction using the density of the steel sheet of 7.65 g/cm³. At this time, the resist pattern was adjusted so that recessed defects were formed per square millimeter.

The cold-rolled steel sheets of the grain-oriented electrical steel with various groove patterns as described above were subjected to decarburization annealing, final annealing, and flattening annealing, and applied with an insulating tension coating, to obtain steel sheets as a finished product.

For comparison, a grain-oriented electrical steel sheet as a finished product in which only linear grooves were formed without forming the discontinuous portion and the recessed defect was also prepared.

A part was cut from the sample sheet thus obtained, and the magnetic properties ($B_8$ and $W_{17/50}$) were measured with the Epstein's method described in JIS C2550. In addition, a 3-phase stacked transformer (iron core weight 500 kg) was prepared with the steel sheet as a finished product, and the iron loss properties were measured at a frequency of 50 Hz when the magnetic flux density in the iron core leg portion was 1.7 T. The iron loss properties at 1.7 T and 50 Hz were measured using a wattmeter to determine the no-load loss. The building factor (BF) was calculated from the result and the $W_{17/50}$ value measured earlier in the Epstein test.

The measurement results are listed in Table 2. It is understood that, when a grain-oriented electrical steel sheet is in the scope of the present disclosure, it has excellent properties in all terms of $B_8$, $W_{17/50}$ and BF, and it is suitable for transformer iron cores.

TABLE 2

| No. | Volume fraction of recessed defect [vol %] | Discontinuous portion [/m²] | $B_8$ [T] | $W_{17/50}$ [W/kg] | BF [—] | Remarks |
|---|---|---|---|---|---|---|
| 1 | 0 | 0 | 1.910 | 0.750 | 1.400 | Comparative example |
| 2 | 0 | 30 | 1.920 | 0.750 | 1.350 | Comparative example |
| 3 | 0 | 120 | 1.925 | 0.750 | 1.350 | Comparative example |
| 4 | 0 | 200 | 1.925 | 0.760 | 1.350 | Comparative example |
| 5 | 0 | 300 | 1.930 | 0.770 | 1.300 | Comparative example |
| 6 | 0.002 | 0 | 1.910 | 0.750 | 1.400 | Comparative example |
| 7 | 0.002 | 30 | 1.920 | 0.750 | 1.350 | Comparative example |
| 8 | 0.002 | 120 | 1.925 | 0.750 | 1.350 | Comparative example |
| 9 | 0.002 | 200 | 1.925 | 0.760 | 1.350 | Comparative example |
| 10 | 0.002 | 300 | 1.930 | 0.770 | 1.300 | Comparative example |
| 11 | 0.0025 | 0 | 1.910 | 0.750 | 1.400 | Comparative example |
| 12 | 0.0025 | 20 | 1.910 | 0.750 | 1.400 | Comparative example |
| 13 | 0.0025 | 30 | 1.920 | 0.750 | 1.300 | Example |
| 14 | 0.0025 | 40 | 1.923 | 0.750 | 1.300 | Example |
| 15 | 0.0025 | 50 | 1.925 | 0.750 | 1.300 | Example |
| 16 | 0.0025 | 120 | 1.925 | 0.750 | 1.300 | Example |
| 17 | 0.0025 | 190 | 1.925 | 0.755 | 1.300 | Example |
| 18 | 0.0025 | 200 | 1.925 | 0.760 | 1.300 | Example |
| 19 | 0.0025 | 210 | 1.930 | 0.770 | 1.300 | Comparative example |
| 20 | 0.0025 | 300 | 1.930 | 0.770 | 1.300 | Comparative example |
| 21 | 0.003 | 0 | 1.910 | 0.750 | 1.400 | Comparative example |
| 22 | 0.003 | 20 | 1.910 | 0.750 | 1.400 | Comparative example |
| 23 | 0.003 | 30 | 1.920 | 0.750 | 1.300 | Example |
| 24 | 0.003 | 40 | 1.923 | 0.750 | 1.300 | Example |
| 25 | 0.003 | 50 | 1.925 | 0.750 | 1.300 | Example |
| 26 | 0.003 | 120 | 1.925 | 0.750 | 1.300 | Example |
| 27 | 0.003 | 190 | 1.925 | 0.755 | 1.300 | Example |
| 28 | 0.003 | 200 | 1.925 | 0.760 | 1.300 | Example |
| 29 | 0.003 | 210 | 1.930 | 0.770 | 1.300 | Comparative example |
| 30 | 0.003 | 300 | 1.930 | 0.770 | 1.300 | Comparative example |
| 31 | 0.006 | 0 | 1.910 | 0.750 | 1.400 | Comparative example |
| 32 | 0.006 | 20 | 1.910 | 0.750 | 1.400 | Comparative example |
| 33 | 0.006 | 30 | 1.920 | 0.750 | 1.300 | Example |
| 34 | 0.006 | 40 | 1.923 | 0.750 | 1.300 | Example |
| 35 | 0.006 | 50 | 1.925 | 0.750 | 1.300 | Example |
| 36 | 0.006 | 120 | 1.925 | 0.750 | 1.300 | Example |
| 37 | 0.006 | 190 | 1.925 | 0.755 | 1.300 | Example |
| 38 | 0.006 | 200 | 1.925 | 0.760 | 1.300 | Example |
| 39 | 0.006 | 210 | 1.930 | 0.770 | 1.300 | Comparative example |
| 40 | 0.006 | 300 | 1.930 | 0.770 | 1.300 | Comparative example |
| 41 | 0.009 | 0 | 1.910 | 0.750 | 1.400 | Comparative example |
| 42 | 0.009 | 20 | 1.910 | 0.750 | 1.400 | Comparative example |
| 43 | 0.009 | 30 | 1.920 | 0.750 | 1.300 | Example |
| 44 | 0.009 | 40 | 1.923 | 0.750 | 1.300 | Example |
| 45 | 0.009 | 50 | 1.925 | 0.750 | 1.300 | Example |

TABLE 2-continued

| No. | Volume fraction of recessed defect [vol %] | Discontinuous portion [/m²] | $B_8$ [T] | $W_{17/50}$ [W/kg] | BF [—] | Remarks |
|---|---|---|---|---|---|---|
| 46 | 0.009 | 120 | 1.925 | 0.750 | 1.300 | Example |
| 47 | 0.009 | 190 | 1.925 | 0.755 | 1.300 | Example |
| 48 | 0.009 | 200 | 1.925 | 0.760 | 1.300 | Example |
| 49 | 0.009 | 210 | 1.930 | 0.770 | 1.300 | Comparative example |
| 50 | 0.009 | 300 | 1.930 | 0.770 | 1.300 | Comparative example |
| 51 | 0.01 | 0 | 1.910 | 0.750 | 1.400 | Comparative example |
| 52 | 0.01 | 20 | 1.910 | 0.750 | 1.400 | Comparative example |
| 53 | 0.01 | 30 | 1.920 | 0.750 | 1.300 | Example |
| 54 | 0.01 | 40 | 1.923 | 0.750 | 1.300 | Example |
| 55 | 0.01 | 50 | 1.925 | 0.750 | 1.300 | Example |
| 56 | 0.01 | 120 | 1.925 | 0.750 | 1.300 | Example |
| 57 | 0.01 | 190 | 1.925 | 0.755 | 1.300 | Example |
| 58 | 0.01 | 200 | 1.925 | 0.760 | 1.300 | Example |
| 59 | 0.01 | 210 | 1.930 | 0.770 | 1.300 | Comparative example |
| 60 | 0.01 | 300 | 1.930 | 0.770 | 1.300 | Comparative example |
| 61 | 0.05 | 0 | 1.900 | 0.760 | 1.350 | Comparative example |
| 62 | 0.05 | 30 | 1.910 | 0.760 | 1.300 | Comparative example |
| 63 | 0.05 | 120 | 1.915 | 0.760 | 1.300 | Comparative example |
| 64 | 0.05 | 200 | 1.915 | 0.770 | 1.300 | Comparative example |
| 65 | 0.05 | 300 | 1.920 | 0.780 | 1.250 | Comparative example |

Example 2

A cold-rolled steel sheet of the grain-oriented electrical steel sheet with a thickness of 0.23 mm was used as a test piece. Over the surface of the steel sheet, a resist pattern was applied using a gravure roll that had been patterned so that, after applying a resist coating, linear grooves could be formed, where the groove width was 100 μm, the interval between the grooves in the rolling direction (inter-groove pitch) was 3 mm, the inclination angle of the groove with respect to the sheet transverse direction of the steel sheet was 10 degrees, the number of the discontinuous portions in the groove per square meter was 100, the maximum number of the discontinuous portions in one linear groove was 1 to 6, and the length of the discontinuous portion in the extending direction of the groove was 5 μm to 60 μm. The cold-rolled steel sheet was subjected to electrolytic etching to form linear grooves where the electrolytic conditions were set to have a groove depth of 20 μm. Next, the resist coating was removed, and then the sample sheet was weighed. The result was weight A.

A resist pattern was applied using a gravure roll that had been patterned so that, after applying a resist coating again to the surface of the sample sheet in the same manner as above, 1 to 60 recessed parts with a diameter of 50 μm for each part were formed per square millimeter of the non-grooved portion. Electrolytic etching was performed to remove the resist coating. Next, the sheet was weighed, and the result was weight B. For each sample, the weight loss was calculated from the weight A and the weight B, and the result was converted to a volume fraction using the density of the steel sheet of 7.65 g/cm³. The depth, that is, the electrolysis conditions were adjusted according to the defect frequency so that this volume fraction was 0.008 vol % in any sample.

The cold-rolled steel sheets of the grain-oriented electrical steel with various groove patterns as described above were subjected to decarburization annealing, final annealing, and flattening annealing, and applied with an insulating tension coating, to obtain steel sheets as a finished product.

For comparison, a grain-oriented electrical steel sheet as a finished product in which only linear grooves were formed without forming the discontinuous portion and the recessed defect was also prepared.

A part was cut from the sample sheet thus obtained, and the magnetic properties ($B_8$ and $W_{17/50}$) were measured with the Epstein's method described in JIS C2550. In addition, a 3-phase stacked transformer (iron core weight 500 kg) was prepared with the steel sheet as a finished product, and the iron loss properties were measured at a frequency of 50 Hz when the magnetic flux density in the iron core leg portion was 1.7 T. The iron loss properties at 1.7 T and 50 Hz were measured using a wattmeter to determine the no-load loss. The building factor (BF) was calculated from the result and the $W_{17/50}$ value measured earlier in the Epstein test.

The measurement results are listed in Table 3. It is understood that, when a grain-oriented electrical steel sheet is in the scope of the present disclosure, it has a better building factor (BF), and it is suitable for transformer iron cores.

TABLE 3

| No | Frequency of recessed defect [/mm²] | Length of discontinuous portion/ Groove width [%] | Maximum number of discontinuous portions [/m] | BF [—] | Remarks |
|---|---|---|---|---|---|
| 1 | 0 | 0 | 0 | 1.40 | Comparative example |
| 2 | 1 | 5 | 1 | 1.22 | Example |
| 3 | 1 | 10 | 1 | 1.21 | Example |
| 4 | 1 | 40 | 1 | 1.21 | Example |
| 5 | 1 | 50 | 1 | 1.22 | Example |
| 6 | 1 | 60 | 1 | 1.25 | Example |
| 7 | 5 | 10 | 1 | 1.20 | Example |
| 8 | 5 | 40 | 1 | 1.20 | Example |
| 9 | 5 | 10 | 4 | 1.20 | Example |
| 10 | 5 | 40 | 4 | 1.20 | Example |
| 11 | 40 | 5 | 1 | 1.21 | Example |
| 12 | 40 | 10 | 1 | 1.20 | Example |
| 13 | 40 | 40 | 1 | 1.20 | Example |
| 14 | 50 | 10 | 1 | 1.21 | Example |
| 15 | 50 | 40 | 1 | 1.21 | Example |
| 16 | 60 | 5 | 1 | 1.25 | Example |
| 17 | 60 | 10 | 1 | 1.24 | Example |
| 18 | 60 | 40 | 1 | 1.24 | Example |
| 19 | 60 | 50 | 1 | 1.25 | Example |
| 20 | 60 | 60 | 1 | 1.27 | Example |
| 21 | 1 | 5 | 4 | 1.22 | Example |
| 22 | 1 | 10 | 4 | 1.21 | Example |

TABLE 3-continued

| No | Frequency of recessed defect [/mm²] | Length of discontinuous portion/ Groove width [%] | Maximum number of discontinuous portions [/m] | BF [—] | Remarks |
|---|---|---|---|---|---|
| 23 | 1  | 40 | 4 | 1.21 | Example |
| 24 | 1  | 50 | 4 | 1.22 | Example |
| 25 | 40 | 50 | 1 | 1.21 | Example |
| 26 | 40 | 60 | 1 | 1.24 | Example |
| 27 | 40 | 5  | 4 | 1.21 | Example |
| 28 | 40 | 10 | 4 | 1.20 | Example |
| 29 | 40 | 40 | 4 | 1.20 | Example |
| 30 | 40 | 50 | 4 | 1.21 | Example |
| 31 | 50 | 10 | 4 | 1.21 | Example |
| 32 | 50 | 40 | 4 | 1.21 | Example |
| 33 | 60 | 5  | 4 | 1.25 | Example |
| 34 | 60 | 10 | 4 | 1.24 | Example |
| 35 | 60 | 40 | 4 | 1.24 | Example |
| 36 | 60 | 50 | 4 | 1.25 | Example |
| 37 | 1  | 5  | 5 | 1.23 | Example |
| 38 | 1  | 10 | 5 | 1.22 | Example |
| 39 | 1  | 40 | 5 | 1.22 | Example |
| 40 | 1  | 50 | 5 | 1.23 | Example |
| 41 | 1  | 60 | 5 | 1.26 | Example |
| 42 | 40 | 5  | 5 | 1.22 | Example |
| 43 | 40 | 10 | 5 | 1.21 | Example |
| 44 | 40 | 40 | 5 | 1.21 | Example |
| 45 | 40 | 50 | 5 | 1.22 | Example |
| 46 | 40 | 60 | 5 | 1.25 | Example |
| 47 | 60 | 5  | 5 | 1.26 | Example |
| 48 | 60 | 10 | 5 | 1.25 | Example |
| 49 | 60 | 40 | 5 | 1.25 | Example |
| 50 | 60 | 50 | 5 | 1.26 | Example |
| 51 | 60 | 60 | 5 | 1.28 | Example |
| 52 | 1  | 5  | 6 | 1.26 | Example |
| 53 | 1  | 10 | 6 | 1.25 | Example |
| 54 | 1  | 40 | 6 | 1.25 | Example |
| 55 | 1  | 50 | 6 | 1.26 | Example |
| 56 | 1  | 60 | 6 | 1.28 | Example |
| 57 | 40 | 5  | 6 | 1.25 | Example |
| 58 | 40 | 10 | 6 | 1.24 | Example |
| 59 | 40 | 40 | 6 | 1.24 | Example |
| 60 | 40 | 50 | 6 | 1.25 | Example |
| 61 | 40 | 60 | 6 | 1.27 | Example |
| 62 | 60 | 5  | 6 | 1.28 | Example |
| 63 | 60 | 10 | 6 | 1.27 | Example |
| 64 | 60 | 40 | 6 | 1.27 | Example |
| 65 | 60 | 50 | 6 | 1.28 | Example |
| 66 | 60 | 60 | 6 | 1.30 | Example |

The invention claimed is:

1. A grain-oriented electrical steel sheet, comprising a plurality of linear grooves extending in a direction crossing a rolling direction of the steel sheet on a surface of the steel sheet, wherein
a surface of the steel sheet between the linear grooves has a recessed defect that is recessed from the surface,
a volume fraction of the recessed defect in the steel sheet is 0.0025 vol % or more and 0.01 vol % or less of a steel sheet without the recessed defect, and
discontinuous portions that disrupt the extension of the linear grooves are provided at a frequency of 30 or more and 200 or less per square meter of the steel sheet.

2. The grain-oriented electrical steel sheet according to claim 1, wherein
the recessed defect is provided at a frequency of 1 or more and 50 or less per square millimeter.

3. The grain-oriented electrical steel sheet according to claim 2, wherein
a length of the discontinuous portion of the linear groove along the extending direction is 50% or less of an average width of the linear groove.

4. The grain-oriented electrical steel sheet according to claim 3, wherein
the number of the discontinuous portions in every one of the linear grooves is 5 or less for one meter length of the linear groove.

5. The grain-oriented electrical steel sheet according to claim 2, wherein
the number of the discontinuous portions in every one of the linear grooves is 5 or less for one meter length of the linear groove.

6. The grain-oriented electrical steel sheet according to claim 1, wherein
a length of the discontinuous portion of the linear groove along the extending direction is 50% or less of an average width of the linear groove.

7. The grain-oriented electrical steel sheet according to claim 6, wherein
the number of the discontinuous portions in every one of the linear grooves is 5 or less for one meter length of the linear groove.

8. The grain-oriented electrical steel sheet according to claim 1, wherein
the number of the discontinuous portions in every one of the linear grooves is 5 or less for one meter length of the linear groove.

* * * * *